United States Patent [19]

Dennis et al.

[11] Patent Number: 5,293,026
[45] Date of Patent: Mar. 8, 1994

[54] HARDSURFACING MATERIAL FOR ENGINE COMPONENTS AND METHOD FOR DEPOSITING SAME

[75] Inventors: Roger D. Dennis, Mulberry, Fla.; Michael L. Killian, Troy, Mich.; Jay M. Larson, Marshall, Mich.; Sundaram L. Narasimhan, Marshall, Mich.; Dennis T. Vukovich, Canton, Mich.; Homer D. Wireman, Ventura, Iowa

[73] Assignee: Eaton Corporation, Cleveland, Ohio

[21] Appl. No.: 646,121

[22] Filed: Jan. 28, 1991

[51] Int. Cl.⁵ .............................................. B23K 9/00
[52] U.S. Cl. ......................... 219/121.59; 219/121.47; 219/76.16; 219/76.15; 219/121; 219/49; 427/398.3; 427/398.2; 228/222
[58] Field of Search ............... 219/76.16, 76.15, 76.11, 219/121.47, 121.59, 121.49; 427/34, 398.1, 392.2, 398.3, 398.4; 228/222, 208

[56] References Cited

U.S. PATENT DOCUMENTS

| | | | |
|---|---|---|---|
| 2,318,263 | 5/1943 | Smith, Jr. | 219/76.11 |
| 3,182,361 | 5/1965 | Trimble | 219/76.11 |
| 4,230,928 | 10/1980 | Janssen | 219/76.16 |
| 4,621,183 | 11/1986 | Takeuchi et al. | 427/34 |
| 4,660,756 | 4/1987 | Geisseler | 219/76.11 |
| 4,745,256 | 5/1988 | Shubert | 219/121.47 |
| 4,894,505 | 1/1990 | Malone et al. | 219/76.11 |

Primary Examiner—Mark H. Paschall
Attorney, Agent, or Firm—F. M. Sajovec

[57] ABSTRACT

A method for applying a hardsurfacing material to a workpiece such as a reciprocating aircraft engine tappet in which a carbon-containing wear resistant material in powder form is applied to a surface of the workpiece in the molten state while a sharp temperature gradient is established from the surface into the body of the workpiece to ensure that solidification occurs from the body upward. The resulting surface material consists of wear resistant carbides in a tough martensitic matrix with minimal formation of graphite.

15 Claims, 2 Drawing Sheets

HARDSURFACING MATERIAL FOR ENGINE COMPONENTS AND METHOD FOR DEPOSITING SAME

The present invention relates to hardsurfaced engine components and more particularly to a hardsurface material for heavy duty aircraft engine components, and a method for depositing such material.

Current heavy duty aircraft tappet bodies are made by placing a medium carbon steel body in a cooled copper chill fixture, placing a cast iron disc on the exposed face of the tappet body, and then melting the cast iron disc by means of a carbon arc. The resulting welded structure is then finished to provide a carbon steel tappet body with a cast iron wear face. While this method has been used successfully, there are certain inherent problems associated with it, such as difficulty in controlling the carbon arc, the need for a high degree of manual skill to perform the method, the tendency for graphite to form at the wear surface, and difficulty in controlling porosity.

The present invention provides an improved material and process for forming such wear face wherein the material of the deposit and the deposition conditions are so chosen as to obtain a unique microstructure consisting of wear resistant carbides in a tough martensitic matrix.

The product made by this process has a more consistent microstructure, a more uniform face hardness and a more uniform thickness of the carbide wear surface than that obtained with previous methods.

The deposit material of the invention can be melted onto the wear surface by any one of several types of heat sources such as a carbon arc, tig arc or plasma transferred arc process. The material which is deposited can be in the form of a rod or cast disc for the tig process and powder for the plasma arc process.

In a preferred process, a powder of desired chemistry is deposited by a plasma transferred arc process. Controlled solidification of the melt is accomplished by setting up a thermal gradient toward the body using a copper chill block and by water cooling. Deposits produced in this manner have been built up to 8 mm with no significant porosity and graphite formation. Melt control is achieved by controlling (a) current (b) cooling (c) powder flow rate (d) rotation speed and (e) torch scanning speed.

Other objectives and advantages of the invention will be apparent from the following description when considered in connection with the drawings, wherein.

Figures 1, 2:
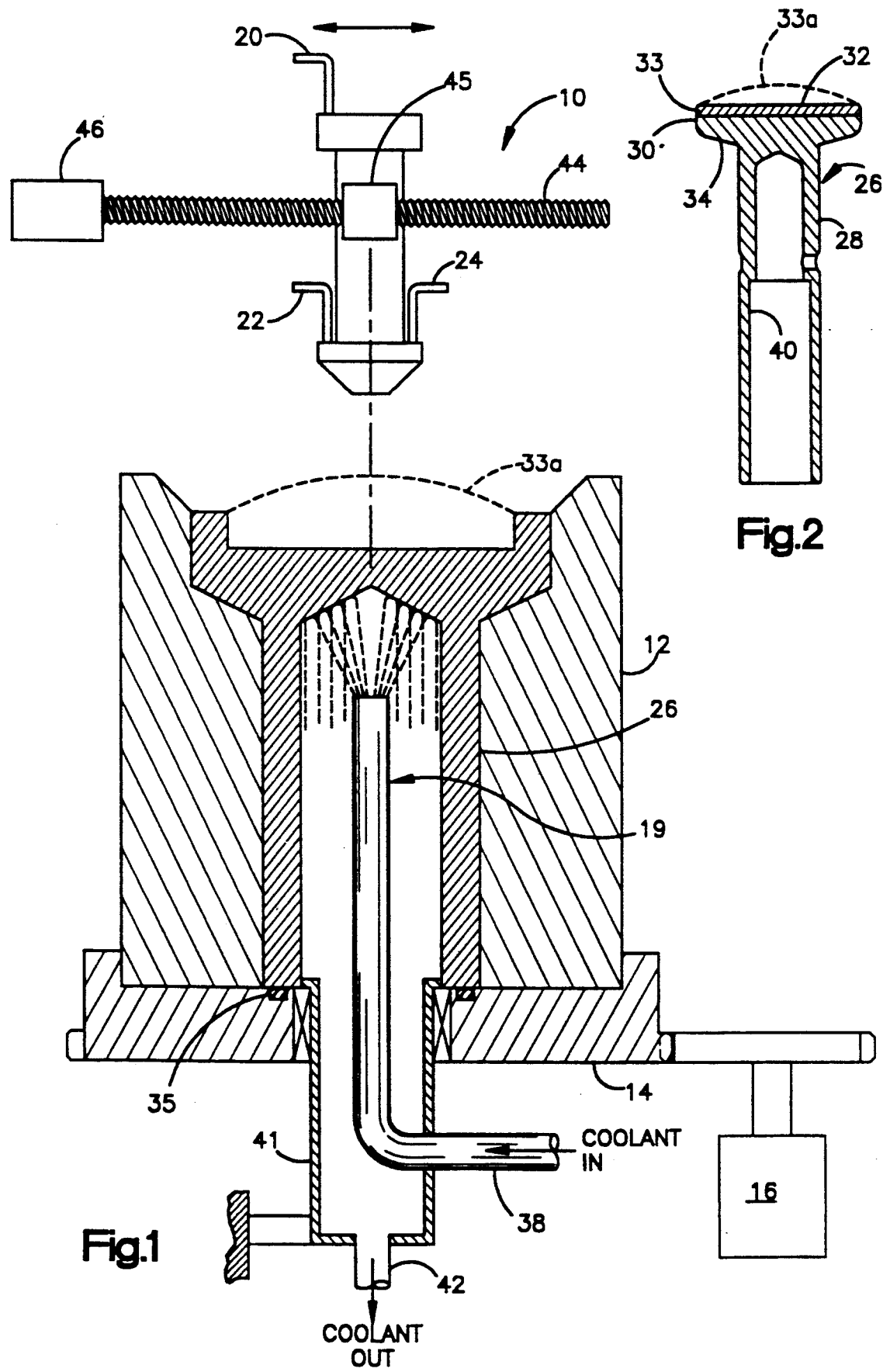
FIG. 1 is a schematic view of apparatus for applying a hardsurfacing material in accordance with the invention.
FIG. 2 is a sectional view of a tappet body to which a hardened wear surface has been applied.

Referring to FIG. 1, there is illustrated a preferred apparatus suitable for performing the method of the present invention. The apparatus, designated generally by the numeral 10, comprises a solid copper chill block 12 mounted on a rotary stage 14 which is geared or otherwise connected to the output of a drive motor 16, a plasma transferred arc (PTA) torch 18 positioned to deposit molten material onto a member supported by the chill block, and means 19 for applying a coolant directly onto the member. In operation, the chill block is rotated about one revolution per minute.

Plasma transferred arc welding is well known in the art and will not be described herein in detail. A particular torch configuration suitable for the present application is described in U.S. Pat. No. 4,104,505 to Rayment et al., which is incorporated herein by reference. In accordance with the PTA process, a powder is fed into the torch by means of an inert gas such as argon. Simultaneously an inert gas such as argon is formed into an ionized plasma by passing the inert gas through an electric arc after which the powdered material and the plasma are combined. The resulting plasma carries and melts the powder material which exits from the torch and is directed toward the article to be hardsurfaced. In the preferred embodiment illustrated, the plasma gas enters the torch through line 20, a shielding gas enters through line 22 and the powder enters the torch through line 24.

Referring to FIG. 2, for purposes of illustration, a tappet body 26 of so-called "nailhead" configuration is shown having a tubular body portion 28, and an increased diameter head portion 30. In a fairly typical application wherein the surface 32 of the head portion defines the cam contact surface of a tappet for a reciprocating aircraft engine, the body diameter is about 1.0 in. and the head diameter is about 1.5 in. To receive the hardsurface material the unfinished head is counterbored to a minimum depth of about 0.020 in.

To apply the hard surface layer 33, the body 26 is placed in the chill block 12, which is configured such that the outer surfaces of the body are in contact with the chill block. The bottom of the tappet body engages a seal 35 in the bottom of the cavity. Cooling water flows from a convenient source through an inlet line 38 which opens into the block cavity, the water flowing freely into the bore 40 of the tappet body and onto the underside of head portion 30 and then cascading down into a stationary collector 41 to a return line 42. In a preferred system, the cooling water is maintained at a temperature between 150° F. and 180° F. The chill block can also be water cooled. The cooling system thus provided establishes a sharp temperature gradient in the head portion of the tappet body thus ensuring that solidification of the hardsurfacing material will progress upward from the bottom of the counterbored area. Such controlled solidification is instrumental in producing the desired wear resistant carbides with minimal formation of graphite.

The torch 18 is mounted for linear movement parallel to the surface of the tappet body; for example, on a lead screw 44 received through a nut 45 fixed to the torch and rotated by a stationary drive motor 46, as shown schematically in FIG. 1. In operation, the torch traverses a linear distance substantially equal to the radius of the top face of the tappet. In the exemplary process, the torch moves at a rate of one stroke per second during processing.

Once the tappet body is mounted in the chill block, the torch traverse and rotation of the chill block is initiated and the torch is energized, ramping up to its full power level of 175 to 200 amps in 10 to 12 seconds. About 5 seconds after the torch is energized, the hardfacing powder is applied at a rate of 30 to 50 grams per minute. The powder is applied at full power for 35 seconds, ensuring that the entire puddle thus formed is the molten state to minimize graphite formation, followed by a 10 second ramp down of torch power and then stoppage of the powder flow. When deposition is complete, a layer 33(a) of the hardsurface material will be built up on the tappet face, as shown in broken line in FIG. 2, to a thickness of 0.050 in. to 0.25 in. measured from the bottom of the counterbore.

After cooling, but within eight hours of deposition, the tappet body is subjected to deepfreezing in solid carbon dioxide or liquid nitrogen for a period of about 30 minutes, the deepfreeze process serving to transform the retained austenite in the weld area to martensite.

After deepfreezing, the tappet body is tempered at 600° F. for two hours to temper the stem and the heat affected zone, resulting in a hardness of 30-40 Rc in the stem area of the tappet body and 58-63 Rc at the wear surface. The part is then finish ground to produce the hardfaced tappet body as shown in FIG. 2.

In accordance with the invention, the preferred hardfacing material is an iron based powder having the following composition:

| Wt % of | Min | Max |
| --- | --- | --- |
| Carbon | 3.2 | 4.2 |
| Manganese | 0.5 | 1.5 |
| Phosphorous |  | 0.10 |
| Sulphur |  | 0.10 |
| Silicon | 1.0 | 2.5 |
| Molybdenum | 0.5 | 2.0 |
| Nickel | 1.5 | 3.0 |
| Chromium | 0.5 | 2.0 |
| Iron | Bal. | Bal. |

Figure 3:
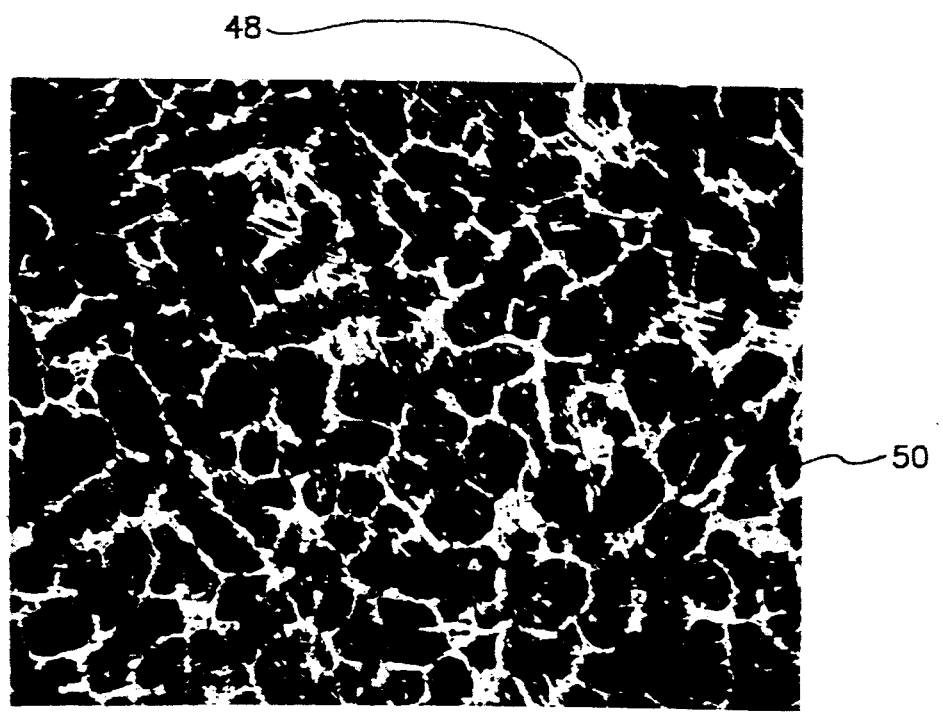
FIG. 3 is a photomicrograph showing the microstructure of the hardsurfacing material of the invention.

FIG. 3 is a photomicrograph of the wear surface of an aircraft tappet showing a microstructure consisting of wear resistant carbides of iron,, chromium and molybdenum in the white areas identified by reference numeral 48, in a martensitic matrix denoted by the black areas identified by reference numeral 50. The composition of the material shown in FIG. 3 is as follows:

|  | % |
| --- | --- |
| Carbon | 3.86 |
| Manganese | 0.90 |
| Phosphorous | 0.015 |
| Sulphur | 0.017 |
| Silicon | 1.71 |
| Molybdenum | 1.38 |
| Nickel | 2.11 |
| Chromium | 1.11 |
| Iron | Bal. |

We claim:

1. A method for applying a wear resistant metallic material to a first surface of a metallic workpiece comprising the steps of supporting the workpiece in intimate contact with a block of heat conducting material with the first surface oriented substantially horizontally, depositing the wear resistant material to said first surface in a molten state, and simultaneously with said deposition step directing a fluid coolant only onto a second surface of a portion of said workpiece directly underlying said first surface.

2. A method as claimed in claim 1 in which said workpiece is a substantially cylindrical member having a blind bore formed therein perpendicular to said first surface and terminating adjacent said first surface, the bottom of said blind bore defining said second surface; said coolant being applied by directing a stream of a cooling fluid to the bottom of said blind bore.

3. A method as claimed in claim 1 in which said material is applied by means of a plasma transferred arc torch.

4. A method as claimed in claim 3 in which said torch is traversed over said first surface while said material is deposited.

5. A method as claimed in claim 4 in which said block is rotated about an axis coinciding with an axis perpendicular to said workpiece surface while said material is deposited.

6. A method as claimed in claim 1 in which said block is formed of copper and said workpiece is received in a cavity in said block with the peripheral surface of said workpiece in intimate contact with surfaces of said block defined by said cavity.

7. A method as claimed in claim 6 further including the step of subjecting said workpiece to a deepfreezing process after completion of the deposition.

8. A method as claimed in any one of claims 1 and 2 in which said material comprises, by weight, 3.2-4.2% carbon, 0.5-1.5% manganese, 0-0.10% phosphorus, 0-0.10% sulphur, 1.0-2.5% silicon, 0.5-2.0% molybdenum, 1.5-3.0% nickel, 0.5-2% chromium and the balance iron.

9. A method as claimed in claim 8, in which said metallic workpiece is formed of a medium carbon steel.

10. In apparatus for applying a wear resistant metallic material to metal workpiece having a first surface and a second surface underlying said first surface, comprising a support block formed of a heat conducting material, said support bloc, having a cavity formed therein to receive the workpiece in intimate contact therewith; and means for applying the wear resistant material in a molten state to said first surface of said workpiece; the improvement comprising means for directing a fluid coolant onto said second surface.

11. Apparatus as claimed in claim 10 in which said means for directing a fluid coolant comprises a conduit received within said cavity, said conduit having an outlet positioned to direct said coolant against said second surface.

12. Apparatus as claimed in claim 10 in which the means for applying the wear resistant material is a plasma transferred arc torch.

13. Apparatus as claimed in claim 12, including means for traversing said torch across said first surface.

14. Apparatus as claimed in any one of claims 10 through 13, including means for rotating said block about an axis coinciding with an axis perpendicular to the first surface.

15. A body member for an internal combustion engine tappet having a wear resistant face formed on a first surface thereof wherein said wear resistant face is formed by supporting the body member in intimate contact with a block of heat conducting material with the first surface oriented substantially horizontally, depositing the wear resistant material to said first surface in a molten state, and simultaneously with said deposition step directing a fluid coolant onto a second surface of a portion of said body member underlying said first surface.

* * * * *